Figure 1:
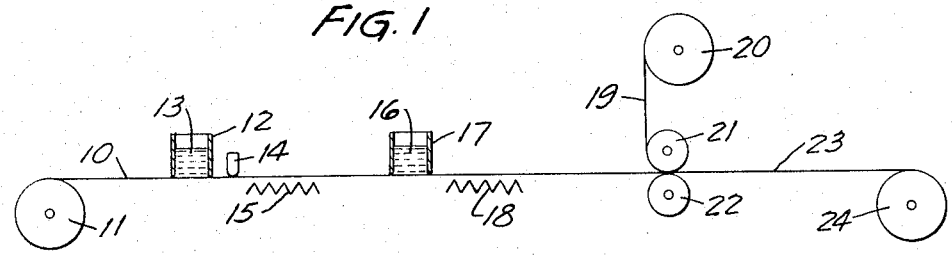

Jan. 31, 1967 C. H. HENRICKSON ET AL 3,301,741
ADHESIVE SHEET AND METHOD OF MAKING
Filed Sept. 11, 1963

INVENTORS
CHARLES H. HENRICKSON
ALTON J. DANIELSON
JAMES V. ERWIN
BY
Carpenter, Abbott, Coulter & Kinney
ATTORNEYS

United States Patent Office 3,301,741
Patented Jan. 31, 1967

3,301,741
ADHESIVE SHEET AND METHOD OF MAKING
Charles H. Henrickson, Newport, Alton J. Danielson, Stillwater, and James V. Erwin, North St. Paul, Minn., assignors to Minnesota Mining and Manufacturing Company, St. Paul, Minn., a corporation of Delaware
Filed Sept. 11, 1963, Ser. No. 308,167
10 Claims. (Cl. 161—119)

This invention relates to articles, particularly sheet materials, made from or coated with adhesives, and to methods of making and using the same; and is particularly, although not exclusively, concerned with adhesive films and coatings wherein the adhesive material is normally tacky and pressure-sensitive.

Pressure-sensitive adhesives as employed on masking tape products and the like are characterized by a "quick-grab" property which permits the tape to adhere on mere contact with adhesive-receptive surfaces to which applied. Once the adhesive tape or sheet contacts the surface it can no longer be moved about without being first stripped from the surface. The application of pressure-sensitive adhesive sheet materials in larger sections to specific surface areas is thereby made unduly difficult. The problem is still more severe where the pressure-sensitive adhesive forms a strong permanent bond with the surface, or where the carrier sheet is easily wrinkled or torn or otherwise distorted.

As an example of the difficulties involved, large sheets of figured or patterned paper or fabric wall-coverings coated with pressure-sensitive adhesive have heretofore been virtually impossible to apply because of the difficulty of matching the pattern while preventing the coated surface from becoming tightly bonded to the wall, and the tendency of the adhesive surface to cohere permanently to itself when once placed in contact. The difficulty has previously been overcome primarily by providing the coated sheet with a removable cover-sheet or liner which may be progressively stripped from the adhesive surface just prior to pressing the latter against the wall. The tension required to remove the liner frequently causes dislocation or wrinkling of previously applied areas, or distortion of the coated covering. Wall coverings accordingly have not ordinarily been bonded in place with pressure-sensitive adhesives.

Even with coverings of much smaller areas, much difficulty has been encountered where extremely accurate positioning or registering of the adhesive-coated covering is required. The locating on a flat sheet-metal base of numbers of small oddly shaped segments of differently colored plastic films or beaded reflex-reflective sheet materials in close-fitting patterns is often required in the manufacture of sign-boards and markers. Precise placing of the segments is difficult when they are adherent on contact. Coating the base surface with a liquid adhesive which for a time permits removal and relocation of the segments has not been found fully effective since the adhesive contains volatile solvents which must first be removed and the dried layer soon cures to a state in which it no longer forms an adherent bond to the film or sheet.

Medallions, labels, face-plates, printed circuit components and other attachments are frequently desired on metal or other substrates. Adhesives containing volatile solvents or vehicles in many instances cannot be used for such purposes because of the difficulty of removing the solvent after the vapor-impermeable covering is in place. Coatings of normally nontacky heat-activatible adhesives or of fusible solder or other metallic bonding agents permit precise positioning of the coated coverings but are not satisfactory on bulky metal substrates having high heat capacity or on substrates which are not sufficiently heat-resistant. Pressure-sensitive adhesives, even though providing ample bonding power and ease of application, have not heretofore been found desirable for these applications because of their "quick-grab" properties which prevent repositioning of the member when once tentatively applied.

The present invention overcomes these and other deficiencies and disadvantages. In a preferred form of the invention there is provided an adhesive coating which is pressure-sensitive and capable of forming a strong adhesive bond with a substrate surface on being pressed thereagainst under moderate hand pressure, but which on light contact with said surface remains unbonded thereto and which may therefore be moved around over the surface and slide into position as desired. Neither drying nor heating of the assembly is required. A firm bond is attained directly, and merely by localized application of pressure.

The invention provides a method of making the slidably positionable adhesive sheet material in a continuous operation using well-known and economically advantageous equipment, materials and unit operations.

The invention also provides a method of making coated slidably positionable adhesive sheet materials in a form in which the coating is effectively protected from pressure-activation even against severe localized application of pressure.

These and other unique and advantageous properties and results are obtained, in accordance with the present invention, by creating at the adhesive surface a uniformly pebbly contour of raised adhesive masses or protrusions separated by intervening planar areas, the exposed tips of the protrusions being rendered non-adhesive. The number and height of the protrusions is just sufficient to prevent contact of the intervening planar adhesive surfaces with the adhesive-receptive surface on which the sheet material is to be slidably positioned. The application of pressure then disrupts the non-adhesive tips, displaces the protrusions, and permits adhesive bonding between the adhesive surfaces and the receptive surface. Surprisingly, the adhesion attained is substantially equal to that attainable in the absence of the separating protrusions.

Figure 2:
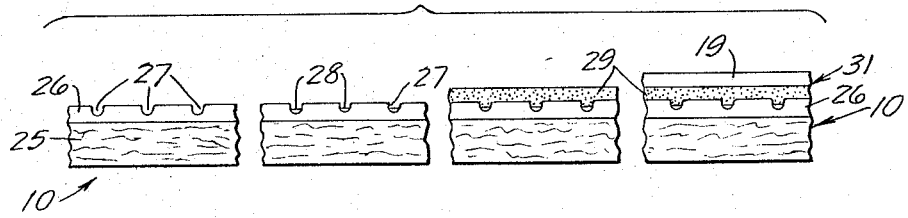
Figure 3:
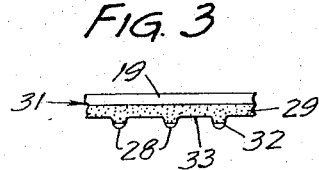
Figure 4:
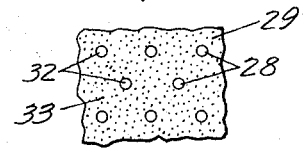
Figure 5:
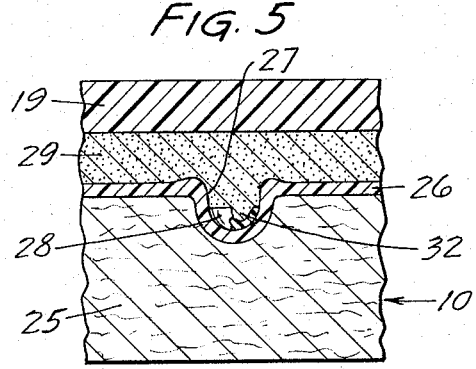

In the drawing:
FIGURE 1 is a schematic representation of a presently preferred method of making the product;
FIGURE 2 represents the several steps in the process in terms of a typical cross-section of the product;
FIGURE 3 is a cross-sectional representation, and FIGURE 4 is a plan view, of a portion of the slidable adhesive coated sheet material; and
FIGURE 5 is an enlarged detail view, primarily in cross-section, of one form of the product of this invention.

As indicated in FIGURE 1, a carrier 10 from supply roll 11 is first lightly coated at coating station 12 with a solution 13 of nonadhesive coating material, wiped clean at the surface by means of a felt wiper 14, and dried over a source of heat 15. A layer of adhesive solution 16 is next applied at coating station 17 and the product is again dried over a heat source 18. A thin backing member 19 from supply roll 20 is brought into pressure-contact with the adhesive-coated carrier between pressure rollers 21 and 22, and the composite product 23 is wound up into storage roll 24 from which it may be removed as desired.

As shown in FIGURE 2, the carrier 10 includes a paper-like support 25 having on one surface a plastic coating 26 which has been embossed or otherwise provided with a pattern of small indents or depressions 27, here indicated for convenience as approximately hemispherical. These depressions are filled with the coating solution 13 which, on drying, provides a thin deposit 28 in each of the depressions 27. The dried adhesive deposit 29 fills the remainder of the depressions and forms a continuous coating over the carrier surface. The film-like backing 19 covers and is adhesively held by the adhesive layer 29.

Separation of the carrier 10 from the adhesive-coated film product 31 is easily accomplished by hand stripping. The adhesive layer thus exposed has a pattern of raised protrusions 32 each capped with a non-adhesive deposit 28, and intervening flat or planar adhesive surfaces 33, as more clearly illustrated in FIGURES 3 and 4.

The structure is illustrated in more detail in FIGURE 5. The cap-like non-adhesive deposit 28, shown here in partial cross-section, is seen to be cup-shaped, to cover the tip of the raised adhesive protrusion 32, and to extend upwardly along the surface of the protrusion, in this instance for about one-half the height thereof. The plastic coating 26 is seen to be depressed into the paper carrier 25 and to provide a slightly raised rim around the edge of the depression 27. In a preferred embodiment the dimensions are approximately in the proportions indicated, the depression 27 being about four mils in depth and about five mils in diameter at the rim.

Polyethylene-coated paper is a particularly effective carrier material. The paper provides adequate strength, flexibility, heat-resistance, and dimensional stability. The polyethylene coating is adequately heat-resistant yet capable of being suitably permanently embossed, is solvent-resistant, and provides a good release surface from which the adhesive and the thin caps or deposits 28 are readily detached. If necessary, the surface of the polyethylene may be rendered still less retentive of such materials by a thin coating of a release agent, such as polymethylsilicone, applied thereover. A specific exemplary carrier material which has given superior results consists of a 65 lb./ream flat paper stock coated with 18 lb./ream of polyethylene which is overcoated with a thin continuous coating of silicone release agent.

The polyethylene coating is conveniently embossed between a hard rubber backup roller and a metal embossing roller. Typically, the rubber roller has a surface durometer reading of 75-90. The embossing roller has a zinc surface which has been etched through a protective resist pattern to a depth of 5 to 6 mils over approximately four-fifths of the total area, leaving a uniform distribution of some 6000 to 8000 extended tips or projections per square inch of surface. These tips or projections may be in the form of flat-topped cones or somewhat irregular hemispheres as generally indicated by the shape of the depression 27 of FIGURE 5, or in any other appropriate shape as will later appear. Embossing is accomplished with the metal roller at 265–275° F. and the rubber roller at 180° F., under a pressure of about 125 lbs./sq. in. and at a lineal speed of five feet per minute.

The dimensions just given represent preferred values but may be widely varied. In general, the number of protrusions per unit area will be greater in the case of very small protrusions. The distance between protrusions, i.e. the area of the planar adhesive surface, may be increased as the height and diameter of the protrusions increased. The height of the protrusions should not be less than 15 microns. The distance between protrusions should be not less than about one-fourth the maximum diameter of the protrusions. Within these general restrictions, specific quantities and dimensions are selected to provide in each case and adhesive sheet material which is capable of being slid into position on an adhesive-receptive work-surface without adhering thereto and of then being adhesively attached to said surface by simple application of pressure.

Polymethylmethacrylate is a preferred material for the nonadhesive caps 28. A 24 percent solution of this polymer in Cellosolve acetate penetrates the tiny depressions of the embossed carrier, and the surplus is easily wiped off. The solvent does not attack the polyethylene or silicone and is easily evaporated at moderately elevated temperature without causing bubbling or blistering. The dried residue remains on the inner surface of the depression and completely covers the closed end thereof, as indicated in FIGURE 5.

These residual non-adhesive cap members are easily detachable from the carrier, and are thin and fragile when so removed. Other film-forming polymers, resins or other materials having equivalent properties are also useful; thus, vinyl polymers, epoxy resins, alkyd resins, polyethylmethacrylate, copolymers of methacrylates and styrene are all useful although less desirable than the polymethylmethacrylate. Sodium silicate and other inorganic film-forming materials are similarly useful where flow properties, drying rates and other characteristics are or may be rendered suitable. Materials which are rapidly hardenable by simple evaporation of volatile solvent, such as the polymethyl methacrylate, are preferred, those requiring chemical reaction or curing being less desirable for practical commercial operation.

The protective cap 28 covers the tip of the adhesive protrusion and extends along the sides for a distance equal to at least about one-fourth but less than all of its height, as illustrated in FIGURE 5. Smaller caps do not adequately protect the adhesive surface as the sheet is slid over the work-surface. The desired coverage is most easily attained by applying the cap material from solution in a volatile solvent at an appropriate concentration, generally within the range of about 20 to about 35 percent. Hence the material used must be capable of forming solutions having sufficient fluidity at the concentration indicated to permit coating on the carrier and penetration of the indents, as well as being capable of removal in hardened form from the indented plastic carrier by stripping of the adhesive coating.

A particularly desirable pressure-sensitive adhesive composition consists of a copolymer of 95 parts by weight of fusel oil acrylate and 5 parts of acrylic acid, applied at a concentration of about 20 to 25 percent in a mixture of commercial heptane and ethyl acetate. Such adhesives have been described in Ulrich Reissue Patent No. 24,906. Another useful adhesive contains 566 parts of a copolymer of three parts of 2-ethylbutyl acrylate and one part of ethyl acrylate, 141 parts of compatible heat-advancing phenol-aldehyde resin, 28 parts of salicylic acid, and 85 parts of "Zirex" zinc resinate, in 6690 parts of heptane and 226 parts of alcohol.

The adhesive mixture is applied in a smooth uniform layer by coating with a knife or bar coater. A coating orifice of about 15 mils, i.e., sufficient to provide a dry adhesive deposit having a weight of about 14 grains per 24 sq. in. test sample, has been found effective in the specific structure described. The coating is dried by heating for about 10 minutes in an oven at 150° F. The amount of adhesive may be varied. It should be sufficient to provide an adequate reservoir of adhesive beneath the protrusions for flowing around the fragmented or folded nonadhesive caps under pressure but need not be uneconomically excessive.

The ability of these pressure-sensitive adhesives to undergo plastic flow under stress is illustrated by an alternative coating procedure in which the adhesive solution is initially coated on the smooth-surface film-like backing and is there dried. The sheet is placed with the adhesive surface in contact with the previously prepared embossed surface of the carrier sheet and the two webs are then forced together e.g. at 180–200° F. and under strong squeeze roll pressure. The solvent-free but still flowable adhesive is forced into the depressions of the embossed surface and into permanent adherent contact with the cup-like nonadhesive tips 28 contained therein.

A biaxially oriented polystyrene film of three mils nominal thickness serves as a preferred backing and in the procedure first described is pressed against the exposed adhesive surface and firmly bonded thereby. Other plastic films, foils, plates or sheet materials, e.g. vinyl resin films, aluminum foil, thin copper plate, or various coated or printed fabric or paper-like webs, may be used. The surface in contact with the adhesive may where desirable be treated, or precoated or primed with an adhesive primer composition, in order to increase the strength of the adhesive bond thereto. Very thin coatings of the same adhesive solution serve as one form of useful primers.

The completed product in the form of stock roll 24 or in stacks of cut sheets is capable of prolonged storage without deterioration despite the tendency of the adhesive to flow under stress. The temporary carrier 10 protects the adhesive surface, more particularly the protrusions 32, by accurately conforming to their surface contours. The structure is capable of withstanding surprisingly severe pressures without in any way deteriorating in ability to be subsequently separated and the adhesive-coated portion applied to a receptive surface.

It will be understood that the backing member 19 may be printed, embossed, colored, reflectorized, or otherwise decorated or supplied with functional surface elements either prior or subsequent to its incorporation in the sheet structure. The pressure-resistance of the composite is particularly significant in permitting surface treatment of the backing after it has been combined with the adhesive as shown in FIGURE 1. Cutting or stamping of the sheet material into desired sizes and shapes is also facilitated.

In use, the adhesive-coated backing and the supporting carrier are stripped apart, and the former is placed with the adhesive surface toward the adhesive-receptive work-surface which is to be covered. The protective caps 28 covering the adhesive protrusions 32, being nonadhesive, do not adhere to the work-surface but instead permit the sheet to be slid around thereon and into the desired position, for example into abutting edge contact and into registry with other segments previously applied. With the segment in place, adhesive contact is obtained by simply applying pressure on the upper surface, for example with the finger-tips or with a blunt-edged scraper bar or small hard roller. The caps 28 are thereby cracked, shattered or folded, the fargments are forced into the adhesive layer, the adhesive protrusions are flattened and caused to flow around the fragments, and the planar adhesive surfaces between and surrounding the protrusions are forced into adhesive contact with the work-surface. The segment is adhesively bonded in place and can no longer be moved about over the surface of the work-piece.

It is to be understood that the number of protrusions per unit area, the diameter and height of the protrusions, the thickness and depth of the non-adhesive cap, and perhaps other specific quantities may vary widely within the approximate limits hereinbefore noted, depending, for example, on the softness or firmness of the adhesive, the thickness of the adhesive layer, the flexibility or stiffness of the backing material, the pressures available or acceptable to the particular structures involved, as well as the contour and nature of the adhesive-receptive surface of the work-piece to which the adhesive-coated sheet material is to be applied. However in most instances, and particularly in such products as thin decorative or protective films or foils which are to be adhered to smooth glass, steel, aluminum or enameled work-pieces, the protrusions will be not less than about one mil or more than about ten mils, and preferably between about one and about six mils, in either diameter or height, and will account for from about one-tenth or about one-third, or preferably about one-fifth to about one-fourth, of the total adhesive area. Similarly the nonadhesive cup-like caps covering the tips of the adhesive protrusions will extend for at least about one-fourth the height of the protrusion. Although hemispherical or truncated conical protrusions are specifically mentioned, it will be understood that other shapes, such as elongate ridges, cubes, triangles, cylinders, cones and the like may alternatively be employed.

The invention will be seen to provide convenient means for directly adhesively applying various decorative, protective, or otherwise useful films, sheets, foils and other objects in desired registry on adhesive-receptive substrates. It will be apparent that the adhesive layer itself may separately be thus applied in desired position by substituting for the permanent backing member a removable temporary carrier, so that articles not themselves carrying an adhesive coating may subsequently be adhesively attached thereto. Various other modifications and combinations will likewise be apparent in view of the foregoing description.

What is claimed is as follows:

1. The method of making an adhesive sheet material capable of being slid into position on an adhesive-receptive work-surface and of then being adhesively anchored in said position by simple application of pressure, said method comprising shaping a pressure-sensitive adhesive surface into a pebbly contour having a uniform pattern of small protrusions and intervening planar surfaces, said protrusions accounting for about one-tenth to about one-third of the total surface area, and capping said protrusions with non-adhesive continuous fragile protective caps extending over at least about one-fourth the height of said protrusions.

2. The method of making an adhesive sheet material capable of being slid into position on an adhesive-receptive work-surface and of then being adhesively anchored in said position by simple application of pressure, said method comprising adhesively bonding to a backing a thin continuous layer of a pressure-sensitive adhesive, shaping the opposite surface of said layer into a pebbly contour having a uniform pattern of small protrusions and intervening planar surfaces, said protrusions accounting for about one-tenth to about one-third of the total surface area, and capping said protrusions with nonadhesive continuous fragile protective caps extending over at least about one-fourth the height of said protrusions.

3. The method of making an adhesive sheet material capable of being slid into position on an adhesive-receptive work-surface and of then being adhesively anchored in said position by simple application of pressure, said method comprising: applying to a temporary carrier having a regularly smoothly pitted adhesive release surface a fluid coating composition in amount just sufficient to provide in each pit or depression in said carrier surface a fragile hardened coating extending over at least about one-quarter but less than all of the inner surface of the said depression; hardening the said composition; and covering the surface of the carrier and filling the said depressions with a thin continuous layer of pressure-sensitive adhesive.

4. An adhesive sheet material capable of being slid into position on an adhesive-receptive work-surface and of then being adhesively anchored in said position by simple application of pressure, said sheet material including a thin continuous layer of pressure-sensitive adhesive having a pebbly contour provided by a uniform pattern of small protrusions of said adhesive separated by intervening planar adhesive surfaces, said protrusions being individually capped with continuous non-adhesive fragile protective coverings extending over at least about one-fourth the height of said protrusions.

5. The adhesive sheet material of claim 4 in which the protrusions extend for about one to about ten mils above the adhesive surfaces and the area covered by the protrusions is about one-tenth to about one-third the total surface area of the adhesive layer.

6. A pressure-sensitive adhesive sheet material capable of being slid into position on an adhesive-receptive surface and of then being adherently bonded to said surface by hand pressure and comprising a backing member having on one surface a layer of pressure-sensitive adhesive with raised protrusions of said adhesive in a uniform pattern and separated by intervening planar adhesive surfaces, said protrusions being individually capped with fragile nonadhesive protective coverings extending over at least about one-fourth the height of said protrusions; and, associated with said sheet material as a coextensive adhesive-protecting removable support member, a sheet material having an adhesive release surface closely conforming to said capped protrusions and planar adhesive surfaces.

7. The product of claim 6 in which the protrusions extend for about one to about ten mils above the adhesive surfaces and the area covered by the protrusions is about one-tenth to about one-third the total surface area of the adhesive layer.

8. An adhesive sheet material comprising a backing coated on one surface with a layer of pressure-sensitive adhesive, the adhesive surface having a pebbly contour of uniformly spaced protrusions separated by intervening planar areas, said protrusions being individually capped with fragile protective nonadhesive polymeric protective coverings extending over at least about one-fourth the height of said protrusions.

9. The product of claim 8 in which the protective coverings comprise a methacrylate resin.

10. The method of making an adhesive sheet material capable of being placed in contact with an adhesive-receptive work-surface and slid into position thereon and of then being adhesively anchored in said position by simple application of pressure, said method comprising: coating a flexible temporary carrier sheet, having a uniform pattern of surface depressions, with a dilute fluid solution of a hard film-forming nonadhesive material in a volatile vehicle; removing all surplus solution from the planar surfaces of said carrier between said depressions; drying the residual material within the said depressions to form in each said depression a thin cup-shaped removable cap member of said film-forming material; applying over the carrier surface and into the depressions therein a continuous coating of pressure-sensitive adhesive; and adherently bonding the exposed surface of said coating to a permanent backing member.

References Cited by the Examiner
UNITED STATES PATENTS

| | | | |
|---|---|---|---|
| Re. 20,694 | 4/1938 | Miller | 161—406 X |
| Re. 24,120 | 2/1956 | Brown | 161—123 X |
| 2,383,884 | 8/1945 | Palmquist | 161—406 X |
| 2,537,126 | 1/1951 | Francis | 161—119 |
| 2,587,594 | 3/1952 | Chavannes et al. | 156—247 |
| 2,638,430 | 5/1953 | Mann | 161—406 X |
| 3,036,945 | 5/1962 | Souza | 161—406 X |
| 3,047,443 | 7/1962 | Anderson | 161—406 X |
| 3,061,500 | 10/1962 | Kreier | 156—245 |
| 3,083,133 | 3/1963 | Hansen et al. | 156—247 X |

MORRIS SUSSMAN, *Primary Examiner.*

E. M. BERGERT, *Examiner.*